United States Patent
Byun et al.

(10) Patent No.: US 9,967,043 B2
(45) Date of Patent: May 8, 2018

(54) METHOD AND APPARATUS FOR TRANSMITTING INTERFERENCE CANCELLATION INFORMATION FOR INTER-CELL INTERFERENCE CANCELLATION

(71) Applicant: LG ELECTRONICS INC., Seoul (KR)

(72) Inventors: Ilmu Byun, Seoul (KR); Heejeong Cho, Seoul (KR); Hyunsoo Ko, Seoul (KR); Hyeyoung Choi, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/513,104

(22) PCT Filed: Nov. 18, 2014

(86) PCT No.: PCT/KR2014/011052
§ 371 (c)(1),
(2) Date: Mar. 21, 2017

(87) PCT Pub. No.: WO2016/052805
PCT Pub. Date: Apr. 7, 2016

(65) Prior Publication Data
US 2017/0294978 A1    Oct. 12, 2017

Related U.S. Application Data

(60) Provisional application No. 62/058,626, filed on Oct. 1, 2014.

(51) Int. Cl.
*H04B 1/04*     (2006.01)
*H04B 17/345*   (2015.01)
(Continued)

(52) U.S. Cl.
CPC ......... *H04B 17/345* (2015.01); *H04B 7/0413* (2013.01); *H04J 11/005* (2013.01); *H04J 2211/005* (2013.01)

(58) Field of Classification Search
USPC .................. 455/63.1, 67.11–67.16, 114.2
See application file for complete search history.

(56) References Cited

U.S. PATENT DOCUMENTS 7,155,228 B2 * 12/2006 Rappaport .......... G01F 23/0061
                                                      455/422.1
7,203,489 B2 *  4/2007 Saunders .............. H04W 16/18
                                                      342/173
(Continued)

FOREIGN PATENT DOCUMENTS

KR    10-2011-0083213 A    7/2011
KR    10-2012-0087423 A    8/2012

OTHER PUBLICATIONS

Yuanye Wang et al., "Performance Analysis of Enhanced Inter-Cell Interference Coordination in LTE-Advanced Heterogeneous Networks", Vehicular Technology Conference (VTC Spring), 2012 IEEE 75th, Yokohama, May 6-9, 2012, pp. 1-5.

(Continued)

*Primary Examiner* — Lana N Le
(74) *Attorney, Agent, or Firm* — Dentons US LLP (57) ABSTRACT

Provided is a method and apparatus for transmitting interference signal information for inter-cell interference cancellation in a wireless communication system. The method for transmitting interference signal information may comprise the steps of: calculating the intensity of a signal on the basis of antenna gain and transmission power for a generated signal; generating probability information on the probability that interference is cancelled when the signal acts as interference; determining interference signal information indicating a feature of the signal when the signal acts as interference, on the basis of the antenna gain, the intensity (Continued)

of the signal, and the probability information; and transmitting the interference signal information to an adjacent cell.

11 Claims, 10 Drawing Sheets

(51) Int. Cl.
*H04B 7/0413* (2017.01)
*H04J 11/00* (2006.01)

(56) References Cited

U.S. PATENT DOCUMENTS

| | | | |
|---|---|---|---|
| 7,932,852 B2* | 4/2011 | Hellsten | G01S 7/023 342/192 |
| 2011/0021153 A1* | 1/2011 | Safavi | H04B 7/0434 455/63.1 |
| 2012/0329403 A1* | 12/2012 | Muraoka | H04W 16/14 455/67.13 |
| 2012/0329498 A1 | 12/2012 | Koo et al. | |
| 2013/0244582 A1* | 9/2013 | Son | H04W 24/08 455/67.13 |
| 2016/0127059 A1* | 5/2016 | Bao | H04B 17/3913 370/252 |

OTHER PUBLICATIONS

Ritt Catt, "TP for combining beam-forming with other inter-cell interference mitigation approaches", R1-060518, 3GPP TSG RAN WG1 Meeting #44, Denver, USA, Feb. 13-17, 2006.

* cited by examiner

METHOD AND APPARATUS FOR TRANSMITTING INTERFERENCE CANCELLATION INFORMATION FOR INTER-CELL INTERFERENCE CANCELLATION

CROSS-REFERENCE TO RELATED APPLICATIONS

This application is a National Stage Application of International Application No. PCT/KR2014/011052, filed on Nov. 18, 2014, which claims the benefit of U.S. Provisional Application No. 62/058,626, filed on Oct. 1,2014, all of which are hereby incorporated by reference in their entirety for the purposes as if fully set forth herein.

BACKGROUND OF THE INVENTION

Field of the Invention

The present invention relates to a method and an apparatus for transmitting interference signal information for inter-cell interference cancellation, and more particularly, to a method and an apparatus for transmitting interference signal information for inter-cell interference cancellation in a massive MIMO system.

Related Art

Recently, commercialization of a long term evolution (LTE) system which is a next-generation wireless communication system has been supported earnestly. After recognizing necessity for supporting not only a voice service but also a large amount service with high quality in response to a user's demand while ensuring activity of a user of a terminal, the LTE system tends to be more rapidly increased than before. The LTE system provides a low transmission delay, a high transfer rate, and an improved system capacity and coverage.

With an introduction of such a high-quality service, there is a rapidly growing demand on a wireless communication service. Above all, capacity of a communication system must be increased to actively cope with this situation. A method of newly discovering an available frequency band and a method of increasing efficiency for a limited resource may be considered as an alternative of increasing communication capacity in a wireless communication environment.

As the method of increasing the efficiency for the limited resource, a so-called multi-antenna transmission/reception technique is actively developed in recent years with a remarkable attention, in which a spatial region for resource utilization is additionally ensured by placing a plurality of antennas to a transceiver to obtain a diversity gain or in which transmission capacity is increased by transmitting data in parallel through the respective antennas.

In a multi-antenna system, beamforming and precoding may be used as a method of increasing a signal to noise ratio (SNR). The beamforming and the precoding are used to maximize the SNR through feedback information in a closed-loop system capable of using the feedback information in a transmitting end.

SUMMARY OF THE INVENTION

One embodiment of the present invention proposes a method and an apparatus for transmitting interference signal information to perform inter-cell interference cancellation in a flexible beamforming-applied communication system.

One embodiment of the present invention proposes a method of generating a signal exhibiting a characteristic of an interference signal in view of an antenna gain in order to perform inter-cell interference cancellation in a massive MIMO system.

A method for transmitting interference signal information for inter-cell interference cancellation according to the present invention may include: calculating a strength of a generated signal based on an antenna gain and a transmission power of the signal; generating probability information on a probability of cancelling interference when the signal acts as interference; determining interference signal information exhibiting a characteristic of the signal acting as interference based on the antenna gain, the strength of the signal and the probability information; and transmitting the interference signal information to an adjacent cell.

According to an aspect of the present invention, inter-cell interference cancellation or interference suppression may be performed in a flexible beamforming-applied communication system.

According to an aspect of the present invention, there is provided a method of generating and transmitting interference signal information that is capable of performing inter-cell interference cancellation or interference suppression in view of an antenna gain in a massive MIMO system.

DESCRIPTION OF EXEMPLARY EMBODIMENTS

The present specification is described based on a communication network, and operations implemented in the communication network may be performed by a system (for example, a base station) responsible for the communication network in controlling the network and transmitting data or may be performed by a terminal linked to the network.

Figure 1:
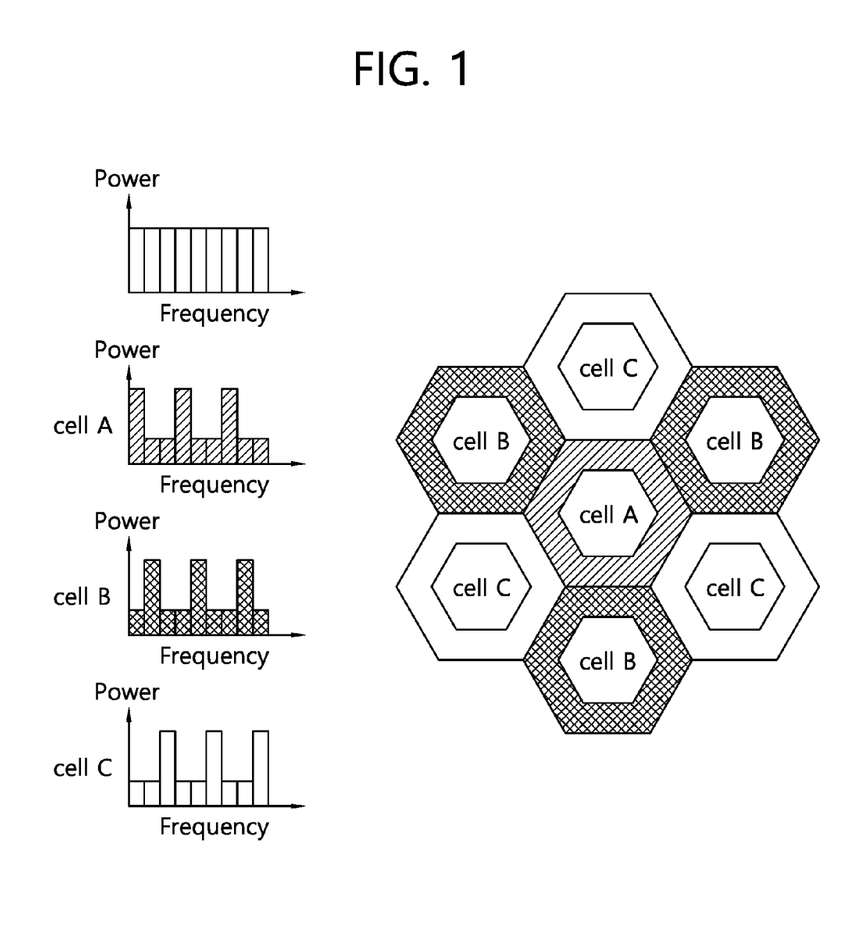
FIG. 1 illustrates inter-cell interference coordination in LTE.

FIG. 1 illustrates inter-cell interference coordination in an LTE system.

In the LTE system, each cell may be divided into inner and outer parts. In the inner part, where users experience a low level of interference and also require less power to communicate with the serving cell, a frequency reuse factor of 1 is adopted.

For the outer part, when the cell schedules a user in a given part of band, system capacity may be optimized if neighbouring cells transmit nothing or if neighbouring cells may performs transmission at low power probably to users in the inner parts of the neighbouring cells in order to avoid creating strong interference to the scheduled user in the first cell.

Such a restriction results in a higher frequency reuse factor at the cell edge, which is often known as partial frequency reuse, as illustrated in FIG. 1.

As illustrated, each of cells A, B, and C may be divided into inner and outer parts, and frequency resources for the edge of each cell are allocated to the cell so as not to overlap with those for adjacent cells. When a specified frequency resource is allocated to the outer part of cell A, the same frequency resource is not allocated to cell B and cell C. When a specified frequency resource is allocated to the outer part of cell B, the same frequency resource is not allocated to cell A and cell C. Likewise, when a specified frequency resource is allocated to the outer part of cell C, the same frequency resource is not allocated to cell A and cell B.

In order to coordinate scheduling in different cells in such a manner, communications between adjacent cells are required. When adjacent cells are managed by the same base station (BS, for example, eNodeB), a coordinated scheduling strategy may be implemented without a need for standardized signaling. However, when adjacent cells are controlled by different BSs, standardized signaling is important, particularly in multivendor networks.

Inter-Cell Interference Coordination (ICIC) in LTE is assumed to be managed in the frequency domain rather than the time domain, and inter-BS signalling is designed to support this, because time domain coordination may interfere with an operation of Hybrid Automatic Repeat reQuest (HARQ) processes, especially in an uplink where synchronous HARQ is used.

In relation to downlink transmission, a bitmap termed Relative Narrowband Transmit Power (RNTP) indicator may be exchanged between BSs over an X2 interface. Each bit of the RNTP indicator corresponding to one resource block (RB) in the frequency domain is used to inform neighboring BSs whether a cell is planning to maintain transmit power for the RB below a certain upper limit. The value of this upper limit and the period for which the indicator is valid are configurable.

For example, an RNTP indicator of 1 may indicate that a cell maintains transmit power for a specific RB, that is, transmits a signal via the RB. An RNTP indicator of 0 may indicate that the cell transmits no signal via the RB, that is, performs no beamforming.

This enables neighbouring cells to take into account an expected level of interference in each RB when scheduling UEs in their own cells.

In case of receiving an indication of high transmit power in an RB in a neighbouring cell, the reaction of the BS is not standardized, thus allowing some freedom of implementation for a scheduling algorithm. However, a typical response could be to avoid scheduling cell-edge users in RBs with high transmit power.

In the definition of the RNTP indicator, transmit power per antenna port is normalized by the maximum output power of a BS or cell, because a cell with a smaller maximum output power, corresponding to smaller cell size, may receive much interference as compared with a cell with a larger maximum output power, corresponding to a larger cell size.

The determination of the RNTP indicator may be performed by Equation 1.

$$RNTP(n_{PRB}) = \begin{cases} 0 & \text{if } \frac{E_A(n_{PRB})}{E_{max\_nom}^{(p)}} \leq RNTP_{threshold} \\ 1 & \text{if no promise about the upper} \\ & \text{limit of } \frac{E_A(n_{PRB})}{E_{max\_nom}^{(p)}} \text{ is made} \end{cases}$$ [Equation 1]

In Equation 1, $E_A(n_{PRB})$ is the maximum intended energy per resource element (EPRE) of UE-specific physical downlink shared channel (PDSCH) REs in orthogonal frequency division multiplexing (OFDM) symbols including no reference signal (RS) in a physical resource block for antenna port p in a specified future time interval, and $n_{PRB}$ is the number of physical resource blocks. $n_{PRB}$ may have a value ranging from 0 to $N_{RB}^{DL}-1$. $RNTP_{threshold}$ may have one value among
{−∞, −11, −10, −9, −8, −7, −6, −5, −4, −3, −2, −1,0, +1, +2, +3}[dB]

Further, in Equation 1, $E_{max\text{-}nom}^{(p)}$ may be represented by Equation 2.

$$E_{max\_nom}^{(p)} = \frac{P_{max}^{(p)} \cdot \frac{1}{\Delta f}}{N_{RB}^{DL} \cdot N_{SC}^{RB}}$$ [Equation 2]

In Equation 2, Δf denotes subcarrier spacing, $N_{RB}^{DL}$ denotes a downlink bandwidth configuration, and $N_{SC}^{RB}$ denotes a resource block size in the frequency domain, expressed based on the number of subcarriers.

According to Equation 1, the RNTP indicator is 0 when the normalized energy of REs $$\frac{E_A(n_{PRB})}{\left(E_{max\_nom}^{(p)}\right)}$$

is equal to or less than preset $RNTP_{threshold}$, while the RNTP indicator is 1 when no regulation about the upper limit of the normalized energy of REs $$\frac{E_A(n_{PRB})}{\left(E_{max\_nom}^{(p)}\right)}$$

is made. That is, when $$\frac{E_A(n_{PRB})}{E_{max\text{-}nom}^{(p)}}$$

is greater than $RNTP_{threshold}$, the RNTP indicator may be 1.

Meanwhile, a transmitting antenna generates stronger electromagnetic waves in some directions than in other directions. A plot of field strength according to direction is called as the antenna's radiation pattern. The radiation pattern is always the same for receiving as for transmitting.

An electromagnetic wave measured at a point far from the antenna is the sum of radiation from all parts of the antenna. Each small part of the antenna radiates waves of different amplitudes and phases, and each of these waves travels a different distance to the point where a receiver is located. These waves increase a gain in some directions and decrease a gain in some directions.

Figure 2:
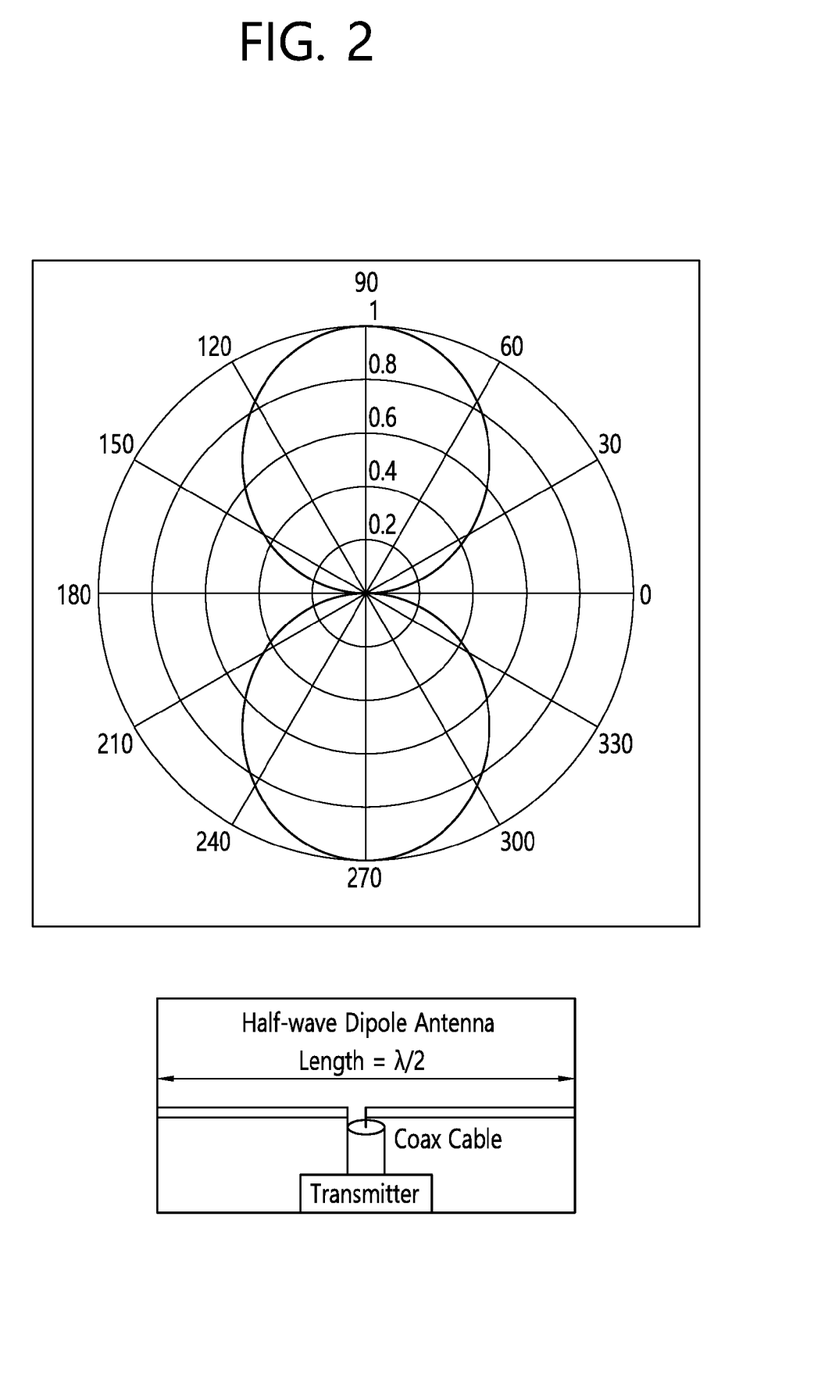
FIG. 2 illustrates a radiation pattern of a half-wave dipole antenna.

A half-wave dipole is a simple antenna that consists of a half wavelength of wire, cut in the center for connection of a cable. FIG. 2 illustrates a radiation pattern of a half-wave dipole antenna.

A directional antenna is designed to have a gain in only one direction and to have a loss in others. An antenna is made directional by increasing a size thereof. A wave radiates from an antenna travels a long distance with a directivity and may be more easily controlled with a directional radiation pattern, whether constructive interference or destructive interference.

Figure 3:
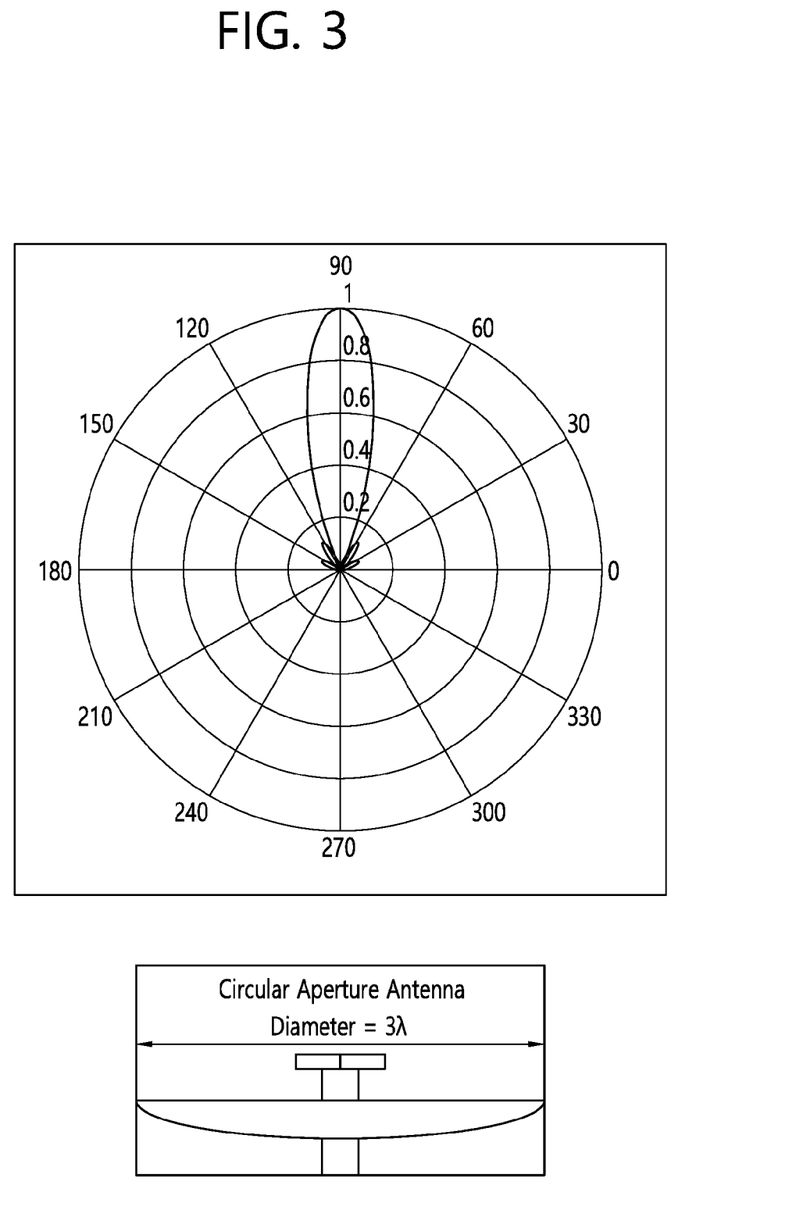
FIG. 3 illustrates a radiation pattern of a circular aperture antenna, such as a satellite dish antenna.

A satellite dish antenna is, simplistically, considered a circular surface that radiates electromagnetic waves equally from all parts. FIG. 3 illustrates a radiation pattern of a circular aperture antenna, such as a satellite dish antenna.

As illustrated in FIG. 3, the radiation pattern has a narrow central beam of high gain. As the diameter of the antenna increases according to wavelength, the central beam gets narrower. Small beams, called side lobes, appear on either side of the central beam. Directions in which a signal has a signal strength of 0 may be called "nulls."

A simple directional antenna includes a linear array of small radiating antenna elements, each of which is provided with identical signals with the same amplitude and phase from one transmitting end. As the total width of the array increases, the central beam becomes narrower. As the number of antenna elements increases, the side lobes become smaller.

Figure 4:
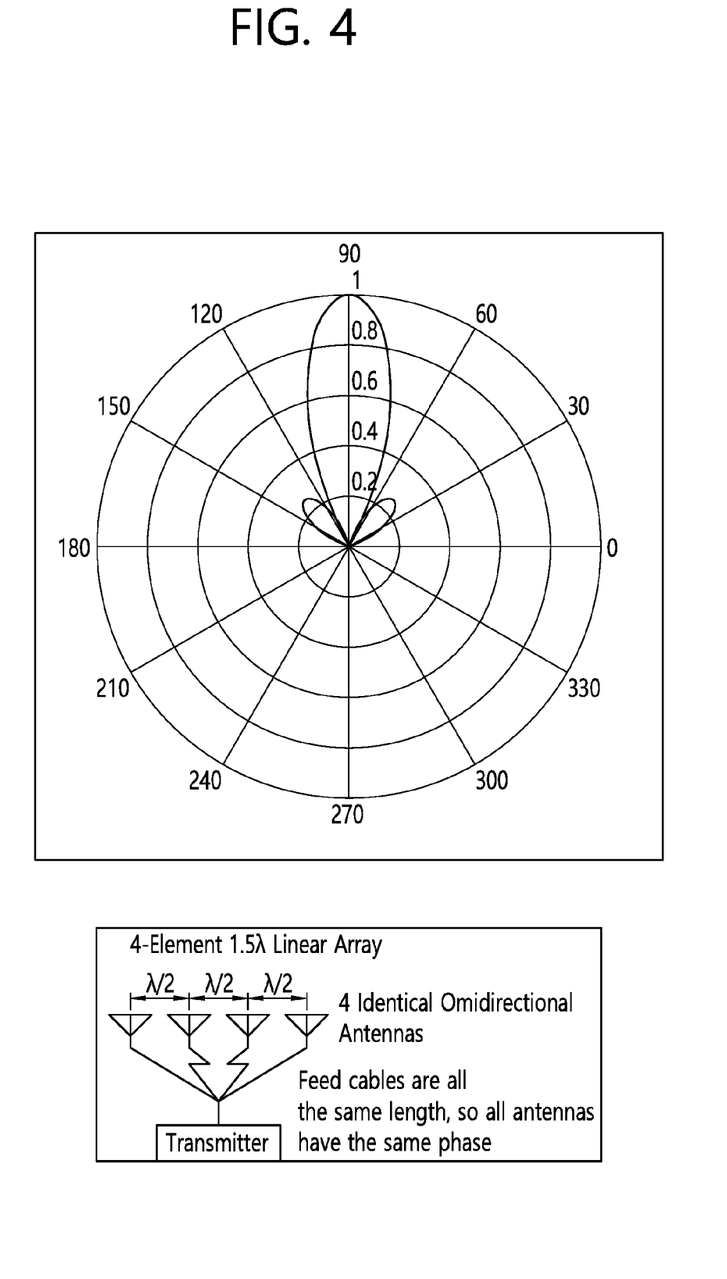
FIG. 4 illustrates a radiation pattern of a linear array antenna.

FIG. 4 illustrates a radiation pattern of a linear array antenna. FIG. 4 shows a radiation pattern of four small antenna elements spaced $1\lambda/2$ apart.

Meanwhile, the radiation pattern of the linear array may be represented by a radiation pattern of a single antenna multiplied by an array factor (AF) representing the effects of constructive interference and destructive interference of each antenna signal. That is, the array factor represents a change in initial antenna gain according to beam width.

Figure 5:
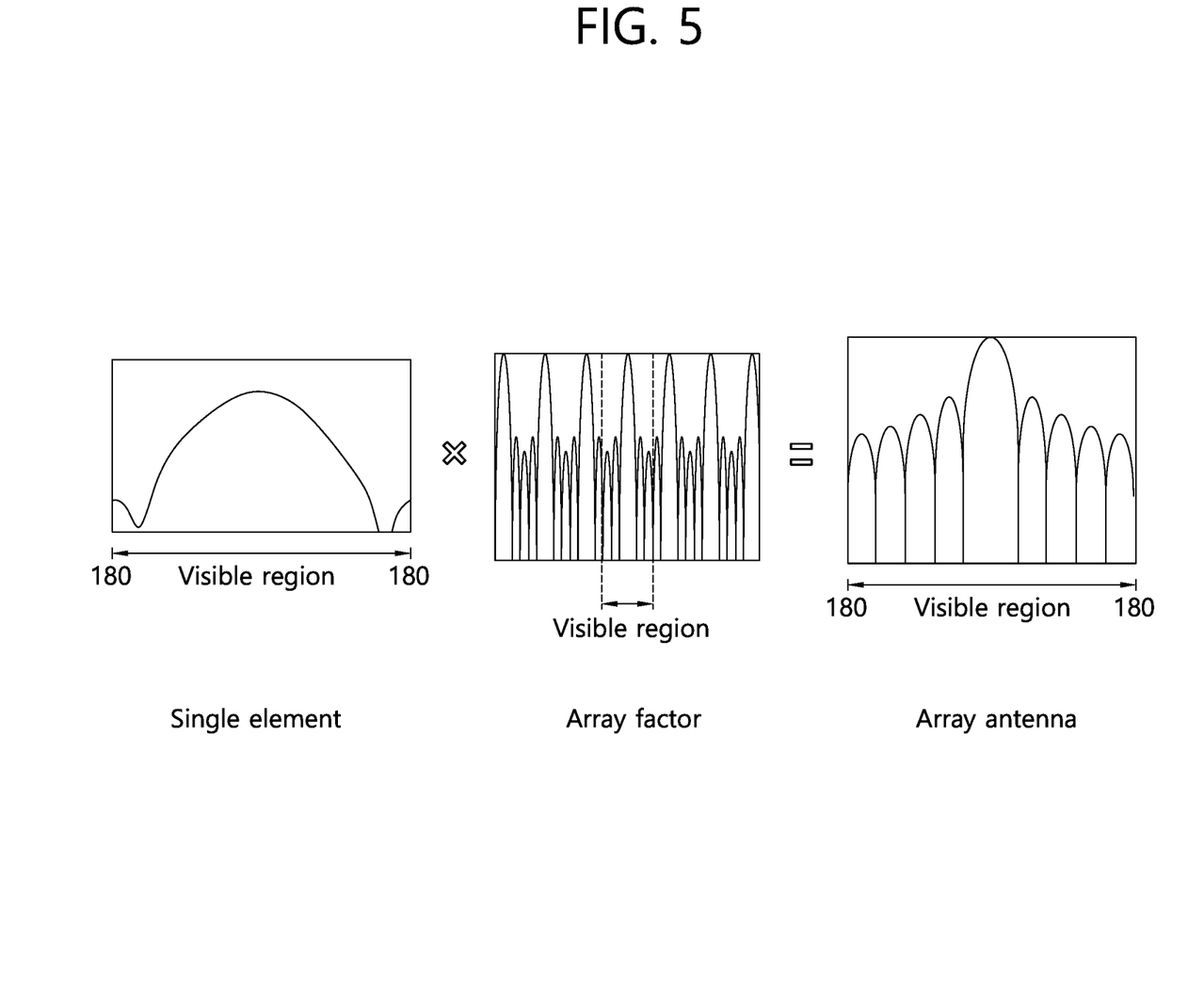
FIG. 5 illustrates a process of obtaining a radiation pattern of a linear array.

FIG. 5 illustrates a process of obtaining a radiation pattern of a linear array. As illustrated in FIG. 5, an antenna gain according to the radiation angle may be obtained by multiplying a radiation pattern ($E_r(\omega)$) of a single element by an array factor.

The array factor may change depending on the number of antennas included in an antenna array, the distance between antennas, and a weight by which each antenna is multiplied. The array factor may be represented by Equation 3.

$$AF(\theta) = \sum_{n=1}^{N_T} w_n e^{j(n-1)(kd\cos\theta+\phi)} \qquad \text{[Equation 3]}$$

In Equation 3, $N_T$ denotes the number of antennas, $w_n$ denotes a weight of each antenna, d denotes the distance between antennas, $k=2\pi/\lambda$ denotes a wave number, $\theta$ denotes the angle of the antenna array from a destination point, and $\varphi$ denotes a phase offset.

When the direction ($\theta$) of a beam directed by the antenna array is 0 and the antennas are equally spaced, the array factor is bilaterally symmetrical based on the directed direction.

When a BS transmits a signal in a direction rotated by x degrees from a boresight at which the antenna is directed, the antenna gain at the destination point of a beam may be represented by $E_r(x)AF(0)$. Further, the beam gain at a point rotated by y degrees from the destination point may be represented by $E_r(x+y)AF(y)$.

As illustrated in FIG. 5, a window (visible region) of the AF may be shifted according to $\theta$ applied to the AF, and the final antenna gain is obtained by multiplying the window and a corresponding antenna radiation pattern.

Figure 6:
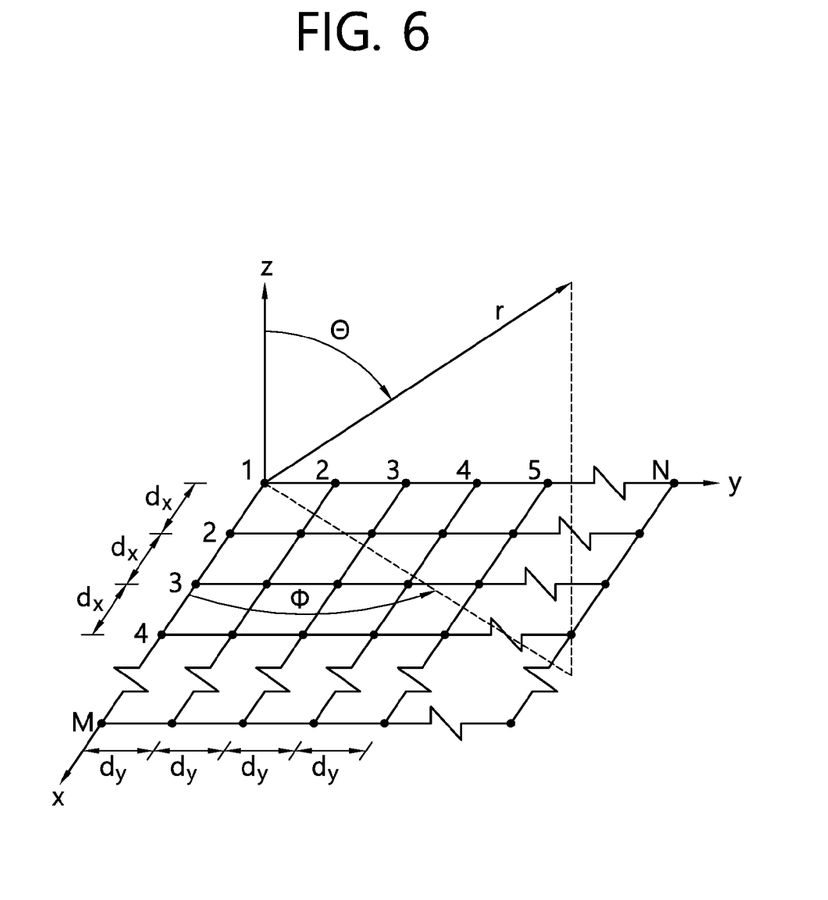
FIG. 6 illustrates a two-dimensionally arranged antenna array.

FIG. 6 illustrates a two-dimensionally arranged antenna array.

As illustrated in FIG. 6, antennas may be arranged at regular intervals in the horizontal direction and the vertical direction, $\theta$ denotes an azimuth angle, and $\varphi$ denotes a vertical angle. dx and dy denote horizontal and vertical intervals between antenna elements.

When the antennas are arranged as in FIG. 6, an AF is represented by Equation 4.

$$AF(\theta,\varphi)=AF_H(\theta,\varphi)AF_v(\theta,\varphi) \qquad \text{[Equation 4]}$$

In Equation 4, AFH and AFV may be represented by Equation 5 and Equation 6.

$$AF_H(\theta,\phi) = \sum_{n=1}^{N} w_{1n} e^{j(n-1)(kd_y\sin\theta\sin\varphi+\beta_y)} \qquad \text{[Equation 5]}$$

$$AF_V(\theta,\phi) = \sum_{m=1}^{M} w_{m1} e^{j(m-1)(kd_x\sin\theta\cos\phi+\beta_x)} \qquad \text{[Equation 6]}$$

Likewise, a radiation pattern of a single antenna may be represented by $E_r(\theta, \varphi)$ using parameters $\theta$ and $\varphi$.

Generally, cell coverage is determined based on the use of an open loop MIMO scheme, because a terminal may not generate feedback information until receiving basic information on a cell and thus may not apply a closed loop MIMO system.

An increase in the number of antennas with the introduction of massive MIMO enables beamforming that is applicable to the closed loop MIMO system, and an antenna gain increases when beamforming is performed. An increased antenna gain increases the strength of a received signal in a cell-edge area, and thus a strong signal reaches an area beyond the coverage to cause strong interference in an adjacent cell.

Figure 7:
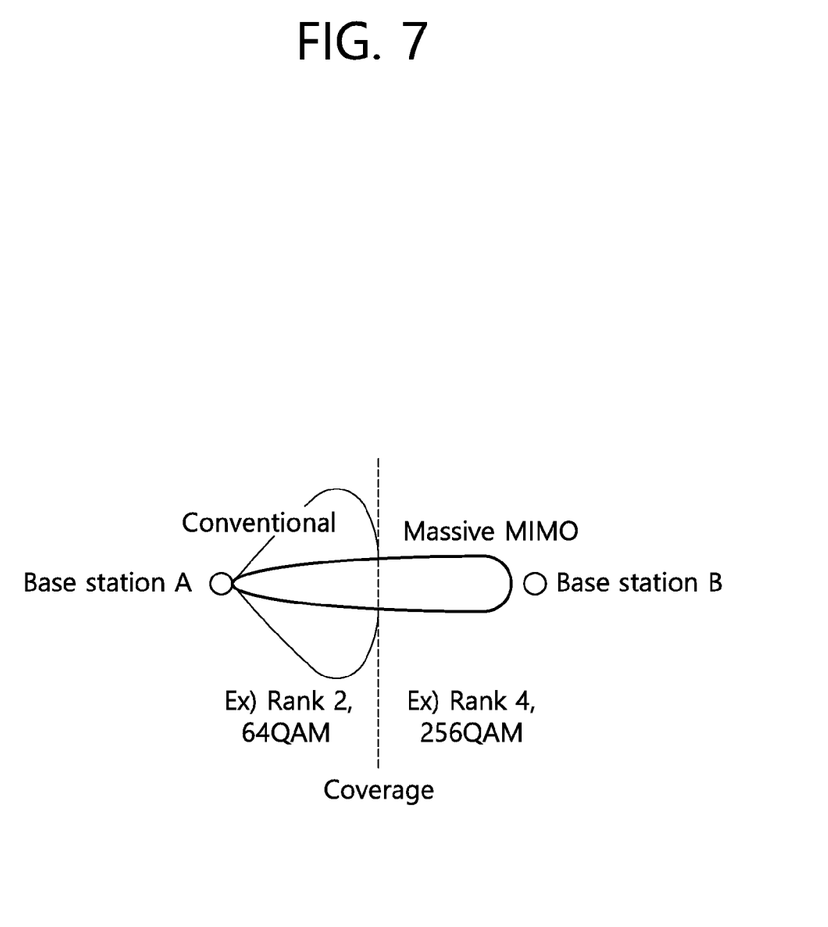
FIG. 7 illustrates a change in beam gain and maximum modulation scheme with the introduction of a massive MIMO system.

FIG. 7 illustrates a change in beam gain and maximum modulation scheme with the introduction of a massive MIMO system.

As illustrated, BS A and BS B are positioned in adjacent cells, and a signal, that is, a beam, transmitted from BS A may act as an interference signal in the cell of BS B.

In this case, a conventional beam generated from BS A has broad coverage close to the cell-edge area, while a beam generated by the application of the massive MIMO system has sharp coverage formed into the adjacent cell.

Further, an increase in antenna gain by massive MIMO may mean an increase in the number of streams to be transmitted by a BS and an increase in maximum modulation scheme level. For example, a beam with a rank of 2 and a 64-QAM modulation scheme is generated in a conventional case, while a beam generated in the massive MIMO system has a rank of 4 and a 256-QAM modulation scheme.

The conventional scheme, in which the BS generates RNTP information according to the level of energy used for a specific resource to cancel inter-cell interference, has a restriction of not exhibiting strong interference generated by an antenna gain.

As described above, an increase in antenna gain by the introduction of massive MIMO means an increase in the number of streams to be simultaneously sent by the BS and in maximum modulation scheme. A future terminal is expected to enable interference cancellation (IC), in which an increase in the number of streams and maximum modulation scheme by the introduction of blind IC may increase the reception complexity of the terminal. Further, the increase in the number of streams and maximum modulation scheme increases interference cancellation failure probability, and the failure of interference cancellation may cause serious performance deterioration of a receiver. The current 3GPP NAICS designs blind interference cancellation to be performed by notifying only a cell ID, a reference signal arrangement form of a cell, and a power ratio between a reference signal and a data signal and thus may not address the foregoing problem.

An aspect of the present invention proposes a method of generating interference signal information that enables each terminal to effectively perform interference suppression and interference cancellation in a network where massive MIMO is introduced and terminals are capable of performing blind interference cancellation.

According to the proposed method, the presence of strong interference caused by an antenna gain of massive MIMO is notified to an adjacent cell, along with information on the cancellation of the caused strong interference.

Further, according to the aspect of the present invention, information on an area where it is requested not to use a strong antenna gain by the massive MIMO system may be notified to the adjacent cell.

To this end, according to one aspect of the present invention, a BS may classify a generated signal as a signal with a high strength in a cell-edge area or a signal with a low strength in the cell-edge area in view of the antenna gain level of the generated signal. The BS may notify the adjacent cell of the ease of interference cancellation based on interference cancellation probability with respect to the signal with the high signal strength in the cell-edge area. Also, the BS may notify the adjacent cell of the coverage of the signal based on a beam width with respect to the signal with the low strength in the cell-edge area.

When the BS notifies the ease of interference cancellation or signal coverage depending on signal strength, the following effects are provided.

When a signal is strong in the cell-edge area due to a high antenna gain, the adjacent cell may allow a cell-edge terminal to cancel interference, or may schedule the terminal by avoiding a beam if interference cancellation is difficult. Therefore, when an antenna gain is high, it is effective to notify the adjacent cell of the ease of interference cancellation.

On the contrary, when a signal is transmitted only within a specific cell due to a low antenna gain and a low transmission power in the cell, it is advantageous that the adjacent cell allocates a user to the cell-edge area.

Meanwhile, when the adjacent cell generates an excessively strong antenna gain, strong interference may occur to a terminal in an internal area of an interfered cell.

The probability of interference may be determined in proportion to a beam width. For example, when a beam is formed with a broad width due to high mobility of a user, the probability of interference is high, and thus it is advantageous to use interference suppression in the corresponding area. Therefore, a scheduler may send a smaller number of streams than the number of receiving antennas via interference-occurring resources or may refrain from generating a strong antenna gain in the resources in a cell generating an interference signal.

Hereinafter, parameters used in the present invention and the meanings of the parameter are as follows.

(1) An IICS($n_{PRB}$) may be defined as an inter-cell interference classification signal, which is a signal exhibiting a characteristic of an interference signal.

The IICS($n_{PRB}$) may be a 2-bit signal, which may serve as an indicator for inter-cell coordination.

The IICS($n_{PRB}$) may be transmitted to a BS of a neighboring adjacent cell and may be transmitted to a cell-edge terminal through the BS of the adjacent cell. When the IICS($n_{PRB}$) is received, the terminal may perform interference cancellation or interference suppression using the IICS ($n_{PRB}$), and the BS may schedule the terminal to avoid interference.

(2) $n_{PRB}$ represents the number of physical resource blocks.

(3) $ETP_{max}(n_{PRB})$ denotes the maximum value of max_Antenna_gain x Tx_power of user frequency resources intended to be scheduled for a future time interval.

max_Antenna_gain x Tx_power denotes the maximum value of an antenna gain multiplied by transmission power.

(4) $p_{max}(n_{PRB})$ denotes the maximum value of the inter-cell interference symbol error rates (IISERs) of user frequency resources intended to be scheduled for a future time interval.

An IISER may denote a symbol error rate (SER) on the assumption that a signal transmitted from a BS reaches a cell-edge area and may be represented by an inter-cell interference symbol error rate.

An IISER may be replaced with an inter-cell interference packet error rate (hereinafter, IIPER).

An IISER and an IIPER may be calculated based on channel information accumulated in the BS.

The BS receives channel information from a terminal and thus may obtain a signal-to-noise-plus-interference ratio (SINR) distribution of a receiving channel thereof based on the channel information. The BS may obtain the SINR average of the bottom x % of users (for example, x≤5) based on the SINR distribution.

Further, when the BS has a bit error rate (BER) or PER curve corresponding to each MCS level and rank, the BS may apply the SINR average of the bottom x % of users to each MCS level, thereby predicting a BER or PER curve for the bottom x % of users.

This obtained BER may be used as an IISER, and the PER may be used as an IIPER. The SINR of the bottom x % of users is used in this scheme, because a terminal located in an adjacent cell, that is, a terminal located in a cell-edge area, is highly likely to be one among the bottom x % of terminals in the cell. Here, regarding a PER, there is a restriction such that an IIPER may be calculated only when the terminal in the adjacent cell completely receives one codeword.

For example, suppose that cell A and cell B are adjacent to each other, and BS A of cell A generates an IICP and reports the IICP to cell B. Cell A and cell B may agree in advance to generate an IISER based on the SINR of the bottom 3% of terminals.

Suppose that cell A is transmitting a single-stream signal to terminal A-1 in cell A and employs 16QAM as a modulation scheme. Further, suppose that cell A is transmitting a multi-stream signal to terminal A-2 in cell A and employs QPSK as a modulation scheme. Suppose that cell A has an SER curve in an additive white Gaussian noise (AWGN) channel for the use of each modulation scheme.

In this case, the BS may estimate the SER of a terminal having the bottom 3% SINR by applying a physical abstraction technique to the SER curves of the modulation schemes of terminal A-1 and terminal A-2. That is, the BS may estimate an IISER using MCS information on terminal A-1 and terminal A-2 and the SINR of the bottom 3% of terminals.

(5) $AG_{max}(n_{PRB})$ denotes the max_Antenna_gain value of user frequency resources intended to be scheduled for a future time interval. Small max_Antenna_gain may mean a broad beam width. max_Antenna_gain refers to the maximum antenna gain.

According to one aspect of the present invention, the $IICS(n_{PRB})$ is represented by Equation 7.

$$IICS(n_{PRB}) = \begin{cases} 1\ 1, & \text{if } ETP_{max}(n_{PRB}) \geq ETP_{threshold}, \\ & p_{max}(n_{PRB}) > IISP_{threshold} \\ 1\ 0, & \text{if } ETP_{max}(n_{PRB}) \geq ETP_{threshold}, \\ & p_{max}(n_{PRB}) \leq IISP_{threshold} \\ 0\ 1, & \text{if } ETP'_{threshold} \leq ETP_{max}(n_{PRB}) < ETP_{threshold}, \\ & AG_{max}(n_{PRB}) \leq AG_{threshold} \\ 0\ 0, & \text{if } ETP_{max}(n_{PRB}) < ETP'_{threshold} \end{cases} \quad \text{[Equation 7]}$$

In Equation 7, $ETP_{threshold}$ denotes a threshold indicating that interference in an adjacent cell is significantly strong, and $ETP'_{threshold}$ denotes a threshold indicating that interference in the adjacent cell is effective. $AG_{threshold}$ denotes an antenna gain, and $IISP_{threshold}$ denotes an IISER threshold. That is, $ETP'_{threshold}$ denotes a threshold illustrating that interference in the adjacent cell is strong enough not to be negligible.

As illustrated in Equation 7, the $IICS(n_{PRB})$ may have a value of 11, 10, 01, and 00.

When the BS receives the $IICS(n_{PRB})$, the BS may provide the $IICS(n_{PRB})$ to a terminal, and the terminal may perform various operations using a corresponding resource according to the received $IICS(n_{PRB})$.

The value of an antenna gain of user frequency resources intended to be scheduled for a future time interval that is multiplied by transmission power, $ETP_{max}(n_{PRB})$, being greater than the threshold $ETP_{threshold}$ indicating strong interference indicates that remarkably strong interference may occur.

Meanwhile, $p_{max}(n_{PRB})$ being greater than the IISER threshold, $IISP_{threshold}$, may indicate that strong interference makes it difficult to recover from interference as in FIG. 7 where a beam generated from BS A may reach an internal area of the cell of BS B to cause interference.

Therefore, an $IICS(n_{PRB})$ of "11" indicates that interference is strong and interference recovery is difficult, in which case the terminal may attempt to avoid interference and the BS may instruct the terminal, which is allocated the corresponding resource, to refrain from performing interference cancellation.

An $IICS(n_{PRB})$ of "10" indicates that interference is strong but interference cancellation probability is high, in which case the BS may intentionally assign a cell-edge terminal to a resource corresponding to "10" to favor interference cancellation. The BS may notify the terminal, which is allocated the corresponding resource, that interference cancellation is easy so that it is possible to perform interference cancellation.

It may be determined whether strong interference is an $IICS(n_{PRB})$ of "11" or "10" based on whether interference cancellation is easy using rank information on a signal or a modulation scheme level.

$ETP_{max}(n_{PRB})$ being greater than $ETP_{threshold}$ and less than $ETP'_{threshold}$ may correspond to the conventional beam in FIG. 7. Further, an antenna gain being less than a predetermined threshold means that a beam is not strong but spread broadly.

When the $IICS(n_{PRB})$ is "01," the BS may maintain a small number of streams simultaneously transmitted so that the terminal receiving the corresponding resource actively uses an interference suppression receiver, such as a minimum mean square error interference rejection combiner (MMSE-IRC) and may allocate the corresponding resource to a terminal positioned in an internal area of the cell.

An $IICS(n_{PRB})$ of "00" indicates insignificant interference, in which case the BS may freely allocate the corresponding resource to a cell-edge terminal.

Figure 8:
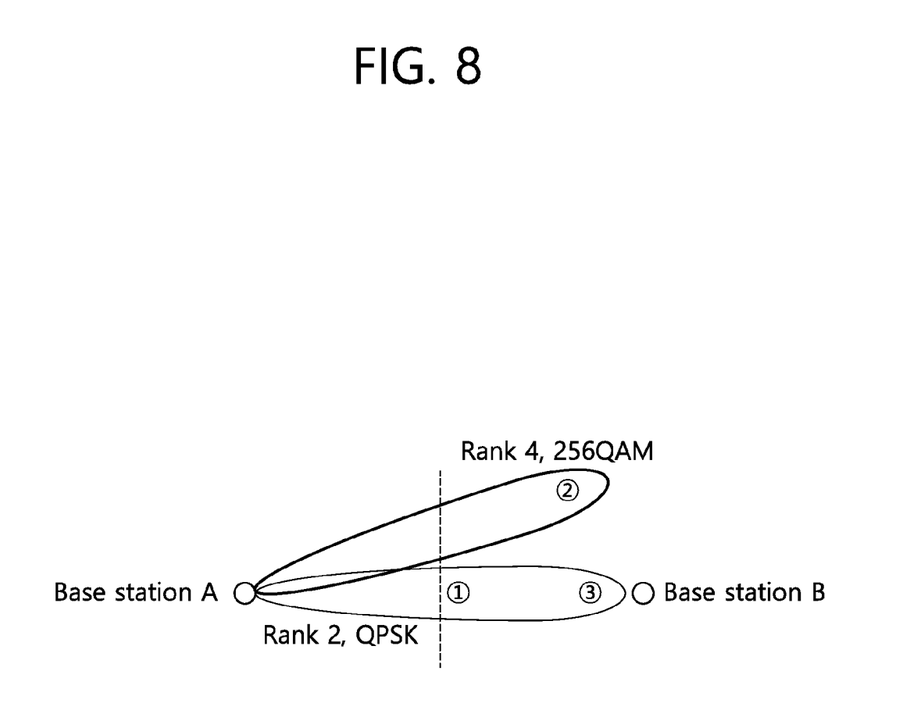
FIG. 8 illustrates the ease of interference cancellation according to one aspect of the present invention.

FIG. 8 illustrates the ease of interference cancellation according to the aspect of the present invention.

As illustrated, suppose that a first beam I with a high rank and a high modulation scheme level and a second beam II with a low rank and a low modulation scheme level are generated from BS A. The first beam I and the second beam II may act as interference signals in the cell of BS B.

Since the second beam II in a cell-edge area ① has a low rank and a low modulation scheme level, interference cancellation is easy. However, Even in the case of the same beam, when the first beam I spreads deep into an internal area ③ of an adjacent cell, interference is strong and thus is not easy to cancel or suppress.

Since the first beam I has a sharp beam width to cause strong interference, has a high rank, and also has a high modulation scheme level, when the first beam I acts as an interference signal in the adjacent cell ②, it is not easy to cancel the interference of the first beam I. In this case, the $IICS(n_{PRB})$ corresponds to "11."

According to another aspect of the present invention, only one threshold for determining the $IICS(n_{PRB})$, not two thresholds as in Equation 7, may be applied. That is, as illustrated in Equation 8, $ETP_{max}(n_{PRB})$ may be compared with $ETP_{threshold}$.

$$IICS(n_{PRB}) = \begin{cases} 1\ 1, & \text{if } ETP_{max}(n_{PRB}) \geq ETP_{threshold}, \\ & p_{max}(n_{PRB}) > IISP_{threshold} \\ 1\ 0, & \text{if } ETP_{max}(n_{PRB}) \geq ETP_{threshold}, \\ & p_{max}(n_{PRB}) \leq IISP_{threshold} \\ 0\ 1, & \text{if } ETP_{max}(n_{PRB}) < ETP_{threshold}, \\ & AG_{max}(n_{PRB}) \leq AG_{threshold} \\ 0\ 0, & \text{otherwise} \end{cases} \quad \text{[Equation 8]}$$

In Equation 8, $ETP_{threshold}$ denotes a threshold indicating that interference in an adjacent cell is significantly strong, and $AG_{threshold}$ denotes an antenna gain. $IISP_{threshold}$ denotes an IISER threshold.

When strong interference occurs, that is, $ETP_{max}(n_{PRB})$ is greater than $ETP_{threshold}$, that is, the $IICS(n_{PRB})$ is "11 or "10," the terminal and the BS may perform interference avoidance or interference cancellation the same as in Equation 7.

Unlike in Equation 7, when the $IICS(n_{PRB})$ is determined to be "01" or "00," $ETP_{max}(n_{PRB})$ is also compared with $ETP_{threshold}$ as the threshold indicating strong interference. That is, as compared with Equation 7, according to Equation 8, cases where the $IICS(n_{PRB})$ is "11" or "10" may increase.

The BS may allocate a signal with a small beamforming gain to a resource that has an $IICS(n_{PRB})$ of "01" in order to cause less interference in an adjacent cell since an interference signal has a broad beam width. Further, the BS may freely assign a terminal regardless of a cell edge or an internal area of a cell in a resource indicated by "00," where beams are less likely to overlap.

According to the other aspect of the present invention, conditions for $p_{max}(n_{PRB})$ in Equation 7 and Equation 8 may be modified into a combination of a modulation scheme and a rank. For example, when $ETP_{max}(n_{PRB})$ is greater than a specified threshold, an expression of comparing the rank-th power of a modulation scheme with a specified value as in Table 1.

TABLE 1

| Method using IISER | Method using modulation scheme and rank |
|---|---|
| $p_{max}(n_{PRB}) \leq IISP_{threshold}$ | $M^L \leq $ threshold |
| $p_{max}(n_{PRB}) > IISP_{threshold}$ | $M^L > $ threshold |

In Table 1, M denotes the number of symbols of a modulation scheme, and L denotes the number of ranks. For example, M is 4 in QPSK, and M is 16 in 16 QAM.

Meanwhile, $p_{max}(n_{PRB})$ being equal to or less than $IISP_{threshold}$ may replaced with $M^L \leq $ threshold, and $p_{max}(n_{PRB})$ being greater than $IISP_{threshold}$ may be replaced with $M^L > $ threshold.

Figure 9:
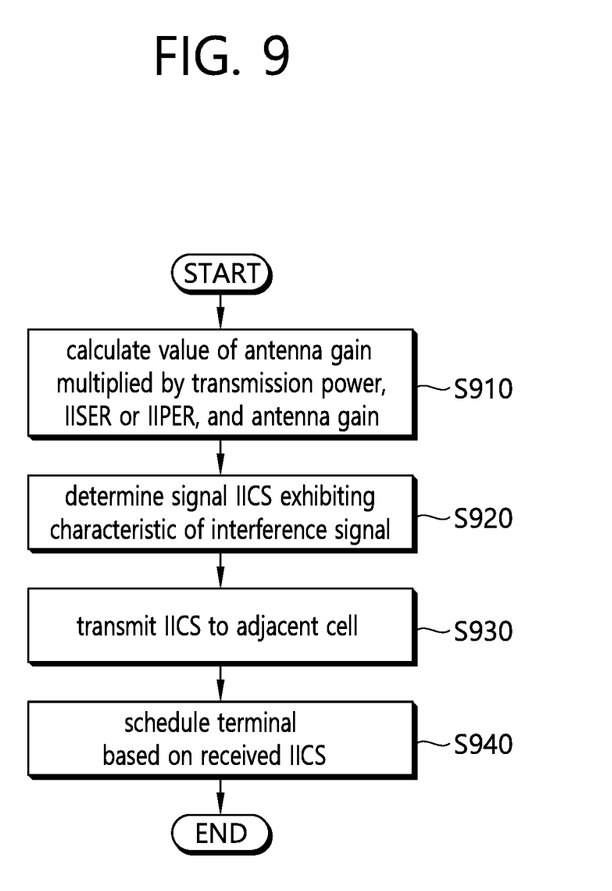
FIG. 9 illustrates a signal transmission method according to one embodiment of the present invention.

FIG. 9 illustrates a signal transmission method according to one embodiment of the present invention.

Referring to FIG. 9, a method of determining an IICS($n_{PRB}$) and a method of transmitting a signal according to the an IICS($n_{PRB}$) according to the present embodiment are described below.

First, a signal transmission device capable of transmitting a signal to a terminal, such as a BS, may calculate a value of an antenna gain multiplied by transmission power, an IISER or IIPER, and an antenna gain (S910).

The value of the antenna gain multiplied by the transmission power may be used to determine the strength of a signal generated from the BS, and a strong signal may act as strong interference in an adjacent cell.

The IISER or IIPER may be calculated using at least one of channel information, an MCS level, and rank information. The BS may acquire an SINR distribution of a channel based on channel information received from a terminal and may calculate an average SINR of a lower proportion of users based on the SINR distribution.

Further, the BS may calculate a BER or PER for the lower proportion of users using a BER or PER curve corresponding to the MCS level and the rank. When the MCS level or the rank is high, the error rate may increase. This BER or PER may be used as an IISER or IIPER for a signal reaching a cell-edge area.

The maximum value of an antenna gain with respect to a specific resource may be used as data to infer a beam width, and a small maximum value of an antenna gain may indicate a broad beam width.

The BS may determine an IICS($n_{PRB}$) as a signal exhibiting a characteristic of an interference signal based on the calculated values (S920).

The IICS($n_{PRB}$) is a 2-bit signal, which may serve as an indicator for inter-cell coordination. The IICS($n_{PRB}$) may be determined according to various conditions. Two thresholds may be used or one threshold may be used to classify the strength of an interference signal in order to determine the IICS($n_{PRB}$).

The IICS($n_{PRB}$) may have a value of 11, 10, 01, and 00. According to one aspect of the present invention, "11" may indicate interference avoidance, "10" may indicate interference cancellation, "01" may indicate the allocation of a resource to a terminal positioned in an internal area of a cell, and "00" may indicate the free allocation of a resource.

The IICS($n_{PRB}$) may be used for resource allocation and scheduling for a terminal in an adjacent cell.

When the IICS($n_{PRB}$) is determined according to various conditions and operations, the BS transmits the determined IICS($n_{PRB}$) to the adjacent cell (S930).

A BS of the adjacent cell receiving the IICS($n_{PRB}$) may allocate a resource or may schedule a terminal according to the IICS($n_{PRB}$).

Further, the BS of the adjacent cell may transmit information on interference cancellation or suppression to a terminal, thereby instructing a terminal capable of interference cancellation to perform interference cancellation or reporting that interference cancellation is impossible.

The BS having transmitted the IICS($n_{PRB}$) may also receive information on an IICS($n_{PRB}$) from the BS of the adjacent cell and may perform terminal scheduling and resource allocation based on the received the IICS($n_{PRB}$) (S940).

As described above, according to one aspect of the present invention, the BS may notify an adjacent cell of the presence of strong interference caused by an antenna gain of massive MIMO, while reporting information on the cancellation of the caused strong interference. To this end, the BS may classify a generated signal as a signal with a high strength in a cell-edge area or a signal with a low strength in view of the antenna gain level of the generated signal. The BS may notify the adjacent cell of the ease of interference cancellation based on interference cancellation probability with respect to the signal with the high signal strength in the cell-edge area. Also, the BS may notify the adjacent cell of the coverage of the signal with the low strength in the cell-edge area based on a beam width.

Figure 10:
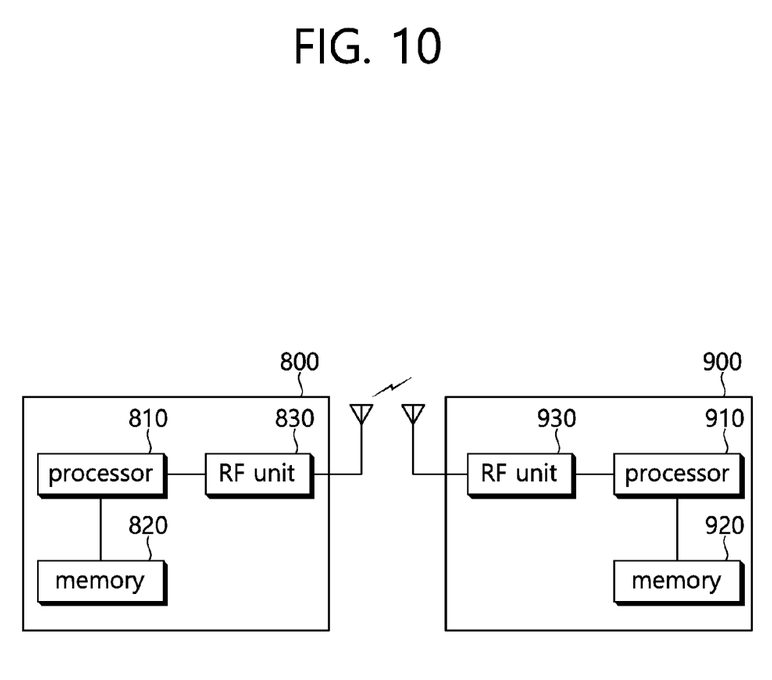
FIG. 10 is a block diagram of a wireless communication system according to one embodiment of the present invention.

FIG. 10 is a block diagram of a wireless communication system according to one embodiment of the present invention.

A BS 800 includes a processor 810, a memory 820, and a radio frequency (RF) unit 830. The processor 810 implements the proposed functions, procedures, and/or methods. Layers of wireless interface protocols may be implemented by the processor 810. The memory 820 is connected with the processor 810 and stores various pieces of information to operate the processor 810. The RF unit 830 is connected with the processor 1110 and transmits and/or receives radio signals.

A terminal 900 includes a processor 910, a memory 920, and a radio frequency (RF) unit 930. The processor 910 implements the proposed functions, procedures, and/or methods. Layers of wireless interface protocols may be implemented by the processor 910. The memory 920 is connected with the processor 910 and stores various pieces of information to operate the processor 910. The RF unit 930 is connected with the processor 1110 and transmits and/or receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

As described above, the present invention proposes a method of setting a relative narrowband transmit power (RNTP) value in order to perform inter-cell interference cancellation in a flexible beamforming-applied communication system.

In the above-described exemplary system, although the methods have been described in the foregoing embodiments on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for transmitting, by a base station of a cell, interference signal information for inter-cell interference cancellation, the method comprising:
    calculating a strength of a generated signal based on an antenna gain and a transmission power of the signal;
    generating probability information on a probability of cancelling interference when the signal acts as interference;
    determining interference signal information indicating a characteristic of the signal acting as interference based on the antenna gain, the strength of the signal and the probability information; and
    transmitting the interference signal information to an adjacent cell.

2. The method of claim 1, wherein the probability information is information indicating whether it is easy to recover the signal based on a modulation and coding scheme level of the signal or rank information on the signal.

3. The method of claim 1, wherein the interference signal information is a signal of two bits, and one of the two bits is determined based on whether the strength of the signal is greater than a predetermined threshold so that the signal acts as strong interference.

4. The method of claim 3, wherein when the signal is determined to act as strong interference, the other bit is determined based on the probability information indicating whether it is easy to recover the signal.

5. The method of claim 3, wherein when the signal is determined not to act as strong interference, the other bit is determined based on whether the antenna gain is greater than a threshold value.

6. The method of claim 1, further comprising:
    transmitting, to a terminal located in the adjacent cell, the interference signal information through a base station of the adjacent cell.

7. A signal transmission device for transmitting interference signal information for inter-cell interference cancellation, the device comprising:
    a signal transceiver; and
    a processor connected to the signal transceiver,
    wherein the processor: calculates a strength of a generated signal based on an antenna gain and a transmission power of the signal; generates probability information on a probability of cancelling interference when the signal acts as interference; determines interference signal information indicating a characteristic of the signal acting as interference based on the antenna gain, the strength of the signal and the probability information; and transmits the interference signal information to an adjacent cell.

8. The device of claim 7, wherein the interference signal information is a signal of two bits, and the processor determines one of the two bits based on whether the strength of the signal is greater than a predetermined threshold so that the signal acts as strong interference.

9. The device of claim 8, wherein when the signal is determined to act as strong interference, the processor determines the other bit based on the probability information indicating whether it is easy to recover the signal.

10. The device of claim 8, wherein when the signal is determined not to act as strong interference, the processor determines the other bit based on whether the antenna gain is greater than a threshold value.

11. The device of claim 8, wherein the processor further:
    transmits, to a terminal located in the adjacent cell, the interference signal information through a base station of the adjacent cell.

* * * * *